(No Model.)
A. TALBOT.
VEHICLE BRAKE.
No. 496,071. Patented Apr. 25, 1893.
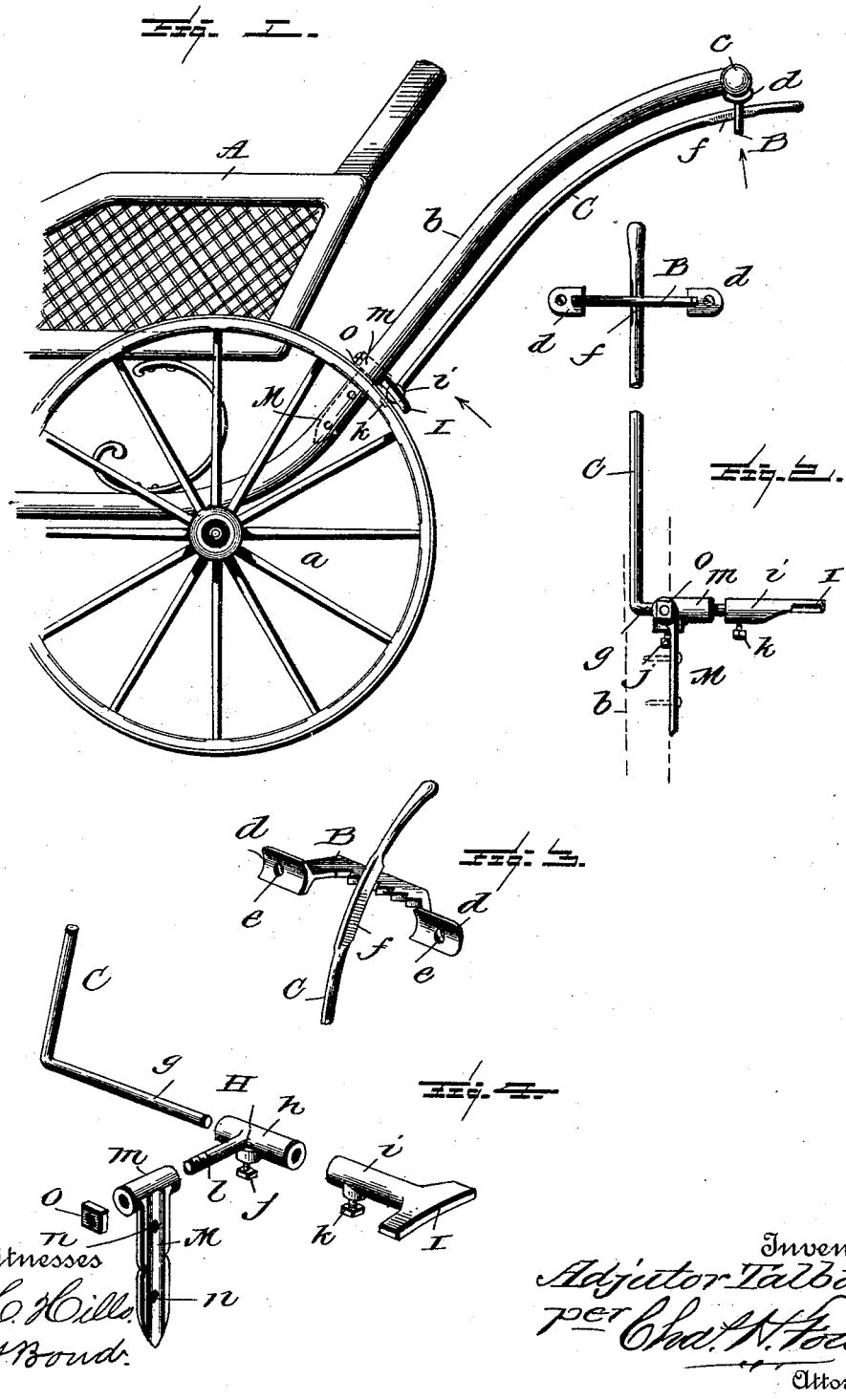
Witnesses
L. C. Hill.
E. H. Boud.
Inventor
Adjutor Talbot,
per Chas. N. Fowler
Attorney
THE NORRIS PETERS CO., PHOTO-LITHO., WASHINGTON, D. C.

UNITED STATES PATENT OFFICE.

ADJUTOR TALBOT, OF NORTH ADAMS, MASSACHUSETTS.

VEHICLE-BRAKE.

SPECIFICATION forming part of Letters Patent No. 496,071, dated April 25, 1893.

Application filed July 30, 1892. Serial No. 441,718. (No model.)

*To all whom it may concern:*

Be it known that I, ADJUTOR TALBOT, a citizen of the United States, residing at North Adams, in the county of Berkshire and State of Massachusetts, have invented certain new and useful Improvements in Vehicle-Brakes; and I do hereby declare that the following is a full, clear, and exact description of the same, reference being had to the annexed drawings, making a part of this specification, and to the letters of reference marked thereon.

This invention relates to certain new and useful improvements in vehicle brakes, designed more particularly for children's carriages, and it has for its objects among others to provide a simple and cheap brake which can be readily applied to any carriage which shall be easy to operate, and durable and efficient in use.

Other objects and advantages of the invention will hereinafter appear and the novel features thereof will be specifically defined by the appended claims.

The invention is clearly illustrated in the accompanying drawings, which, with the letters of reference marked thereon, form a part of this specification and in which Figure 1 is a side elevation of a portion of a child's carriage with my improvements applied. Fig. 2 is a view looking at the under side of the brake lever. Fig. 3 is a perspective view of the upper end of the brake lever and its engaging ratchet. Fig. 4 is a perspective view of the brake mechanism with the parts disassembled.

Like letters of reference indicate like parts throughout the several views.

Referring now to the details of the drawings by letter, A designates the rear portion of a child's carriage of any known or approved construction, of which $a$ is one of the rear wheels and $b$ the handle of which $c$ is the cross bar.

B is a rack bar or ratchet having at each end a concave portion $d$ perforated as at $e$ and adapted to fit the under side of the cross bar of the handle to which it is secured in any suitable manner as for instance by screws passed through the holes therein. The toothed portion of this ratchet is offset from the end portions as seen in Fig. 3 so as to provide room between the toothed portion and the cross bar of the handle for the upper end of the brake lever.

C is the brake lever. It is somewhat curved to follow the contour of the handle of the carriage and at its upper end is formed with a suitable handle and just below said handle with a flattened portion $f$ to engage the teeth of the ratchet as seen best in Fig. 3. The lower end of this lever is bent at right angles to its length and extends horizontally as seen at $g$, and this horizontal portion extends through a tubular portion $h$ of a sleeve or casting H and into the tubular portion $i$ of the brake I, being secured in each of these tubular portions by the set screws $j$ and $k$ respectively. The casting H has an extension $l$ which is screw threaded as seen in Fig. 4 and which extends through the tubular portion $m$ of the bracket M which is designed to be secured to the handle of the carriage by suitable means passed through the holes $n$ therein as shown by dotted lines in Fig. 1.

O is a nut which engages the end of the extenson $l$ after it has passed through the tubular part of the bracket as seen in Fig. 2. The extension $l$ turns freely in the tubular portion $m$ and thus serves as the pivot on which the brake and brake lever work.

The operation will be readily understood from the foregoing description when taken in connection with the drawings and a detailed description thereof is not deemed necessary. To apply the brake the upper end of the brake lever should be pushed to the left and engaged in the proper notch; to throw off the brake push the lever to the right and engage it in the last notch to hold it away from the wheel.

What I claim as new is—

1. The combination with the brake lever having right angled lower end, of a casting for supporting said lower end, a brake secured to the end of the extension and a bracket to which the said casting is pivotally connected, as set forth.

2. The combination with the brake lever having right angled lower end, of a casting through a portion of which the said end passes and a screw threaded extension, and a brake on the end of the lever and a bracket having a portion through which said extension passes loosely, as set forth.

3. The combination with the brake lever having right angled lower end, of the casting with tubular portion and screw threaded extension, the brake with tubular portion and set screw, and the bracket with tubular portion through which said extension passes loosely, and a nut engaging the end of the extension, substantially as specified.

In testimony that I claim the above I have hereunto subscribed my name in the presence of two witnesses.

ADJUTOR TALBOT.

Witnesses:
J. A. CHENDRON,
T. L. WINCHESTER.